(12) United States Patent
Kobayashi et al.

(10) Patent No.: US 6,176,303 B1
(45) Date of Patent: Jan. 23, 2001

(54) HEAT EXCHANGER AND METHOD FOR MANUFACTURING HEADER TANK

(75) Inventors: Osamu Kobayashi, Kariya; Yoshiyuki Yamauchi, Chita-gun; Ken Yamamoto, Obu, all of (JP)

(73) Assignee: Denso Corporation, Kariya (JP)

( * ) Notice: Under 35 U.S.C. 154(b), the term of this patent shall be extended for 0 days.

(21) Appl. No.: 09/243,361

(22) Filed: Feb. 1, 1999

(30) Foreign Application Priority Data

Feb. 16, 1998 (JP) .................................................. 10-033335

(51) Int. Cl.[7] ................................ F28F 9/02; F28D 1/053
(52) U.S. Cl. ........................ 165/175; 165/153; 165/173; 165/178
(58) Field of Search ................................ 165/153, 173, 165/175, 178, 174

(56) References Cited

U.S. PATENT DOCUMENTS

| | | | |
|---|---|---|---|
| 3,411,196 | * 11/1968 | Zehnder | 165/178 X |
| 3,670,812 | * 6/1972 | Bemrose | 165/175 |
| 4,722,387 | * 2/1988 | Aurand | 165/153 |
| 5,172,761 | * 12/1992 | Lyon | 165/173 |
| 5,320,165 | * 6/1994 | Hughes | 165/153 |
| 5,743,329 | * 4/1998 | Damsohn et al. | 165/174 |

FOREIGN PATENT DOCUMENTS

| | | | |
|---|---|---|---|
| 2013804 | * 10/1971 | (DE) | 165/175 |
| 840451 | * 7/1960 | (GB) | 165/175 |
| 55-10073 | 1/1980 | (JP) . | |

\* cited by examiner

*Primary Examiner*—Leonard Leo
(74) *Attorney, Agent, or Firm*—Harness, Dickey & Pierce, PLC

(57) ABSTRACT

A radiator includes a plurality of flat tubes in which refrigerant flows, corrugated fins each of which is disposed between adjacent the flat tubes, and a header tank disposed at both end sides of each flat tube in a longitudinal direction of the flat tubes. A plurality of insertion holes into which the flat tubes are inserted are formed in a tank portion of the header tank, and each of the insertion holes has a hole width approximately equal to a tank width of the header tank in a width direction perpendicular to both of the longitudinal direction of the flat tubes and an extending direction of the header tank. The tank portion of the header tank is integrally formed from extruding or drawing, and the insertion holes are formed by shaving the tank portion after the extruding or drawing. Thus, the insertion holes can be readily provided in the tank portion integrally formed from the extruding or the drawing, and pressure tightness and manufacturing workability of the header tank can be improved.

11 Claims, 5 Drawing Sheets

HEAT EXCHANGER AND METHOD FOR MANUFACTURING HEADER TANK

CROSS-REFERENCE TO RELATED APPLICATION

This application is related to and claims priority from Japanese Patent Application No. Hei. 10-33335, filed on Feb. 16, 1998, the contents of which are hereby incorporated by reference.

BACKGROUND OF THE INVENTION

1. Field of the Invention

The present invention relates to a heat exchanger for a refrigerant cycle in which carbon dioxide ($CO_2$) circulates. More particularly, the present invention relates to a method for manufacturing a header tank of the heat exchanger.

2. Description of Related Art

In the recent years, instead of flon, $CO_2$ is used as a refrigerant in a refrigerant cycle (hereinafter, referred to as $CO_2$ refrigerant cycle). In the $CO_2$ refrigerant cycle, a pressure of $CO_2$ refrigerant at a discharging side of a compressor exceeds the critical pressure, and is approximately 10 times of a pressure of flon refrigerant at the discharging side of the compressor. Therefore, in the $CO_2$ refrigerant cycle, a sufficient strength is necessary at a brazing portion of a heat exchanger. For example, in a conventional radiator described in JP-U-55-10073, as shown in FIGS. 7A, 7B, insertion holes 25 into which flat tubes 11 are inserted are formed in a tank plate 20a of a header tank by press-punching, and a header cover 20b is brazed to the tank plate 20a. Therefore, it is difficult for the conventional radiator to be used in the $CO_2$ refrigerant cycle.

SUMMARY OF THE INVENTION

In view of the foregoing problems, it is an object of the present invention to provide a heat exchanger which has a sufficient pressure tightness, and is readily manufactured with simple workability.

According to the present invention, in a heat exchanger, a tank portion of a header tank has insertion holes into which a plurality of tubes are inserted at predetermined position, each of the insertion holes has a hole width in a width direction perpendicular to both of a longitudinal direction of the tubes and an extending direction of the tank portion, and the hole width is approximately equal to a tank width of the tank portion in the width direction. Therefore, the tank width can be made smaller relative to the tubes, and pressure tightness of the tank portion can be improved.

Further, the tank portion of the header tank is integrally formed by extrusion or drawing of an aluminum material, and the insertion holes are formed by shaving the tank portion after the extruding or the drawing. Thus, the workability of the heat exchanger can be improved while the pressure tightness of the tank portion of the header tank can be improved.

Preferably, the tank portion has an inner wall forming a tank passage in which a fluid flows, and a supporting portion extending in a direction parallel to the longitudinal direction of the tubes to connect the inner wall of the tank portion and to partition the tank passage into a plurality of spaces. Further, a communication pass through which the spaces of the tank passage communicate with each other is formed in the supporting portion by shaving the supporting portion. Thus, the pressure tightness of the tank portion of the heat exchanger can be further improved.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention are described hereinafter with reference to the accompanying drawings.

Figure 1:
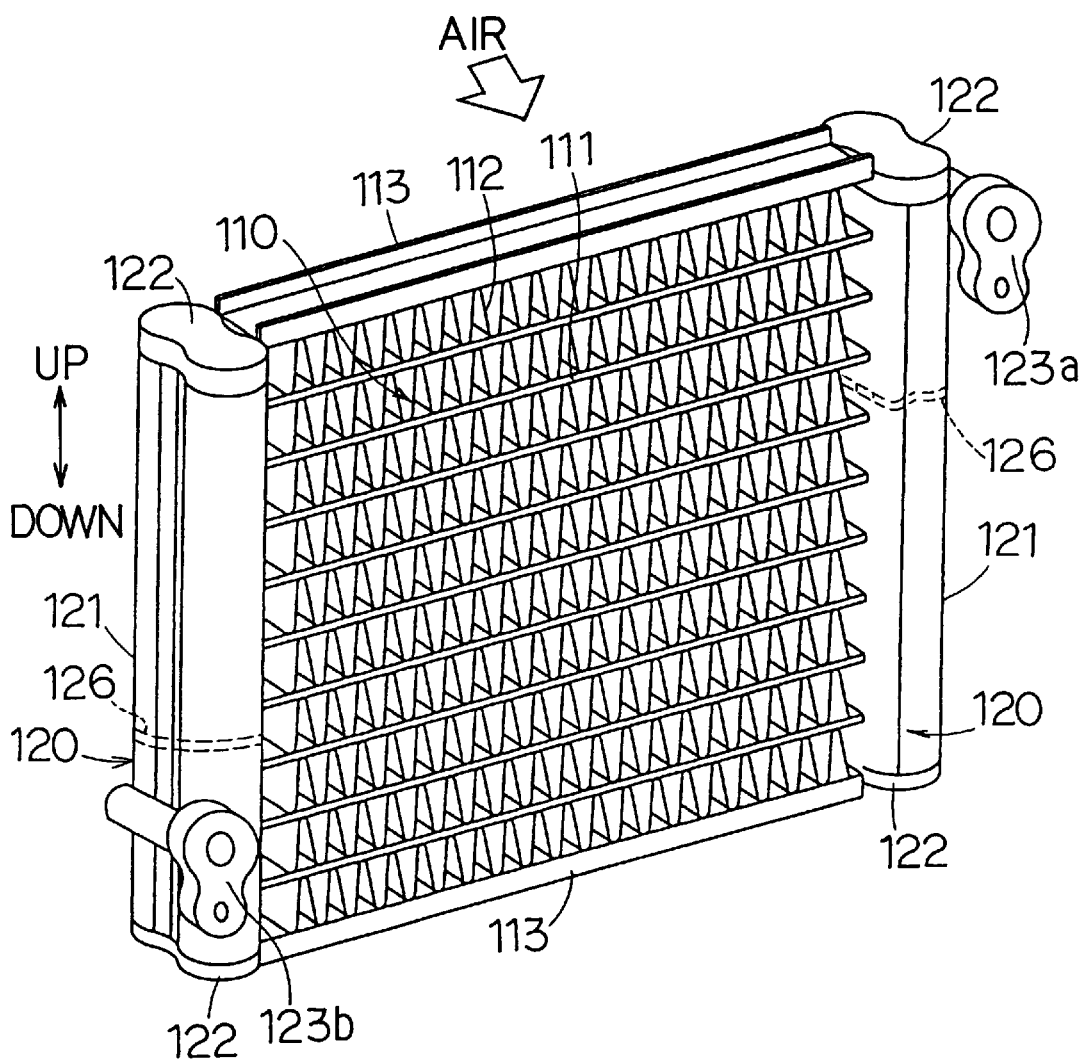
FIG. 1 is a perspective diagram of a radiator according to a first preferred embodiment of the present invention.

A first preferred embodiment of the present invention will be now described with reference to FIGS. 1–4. In the first embodiment, a radiator 100 (i.e., heat exchanger) shown in FIG. 1 is typically used for a $CO_2$ refrigerant cycle. As shown in FIG. 1, the radiator 100 includes a core portion 110 composed of a plurality of flat tubes 111 in which $CO_2$ refrigerant flows, and a plurality of corrugated fins 112 each of which is disposed between adjacent the flat tubes 111. In the core portion 110, $CO_2$ refrigerant flowing through the flat tubes 111 is heat-exchanged with air passing through between the corrugated fins 112 and the flat tubes 111.

Figure 2:
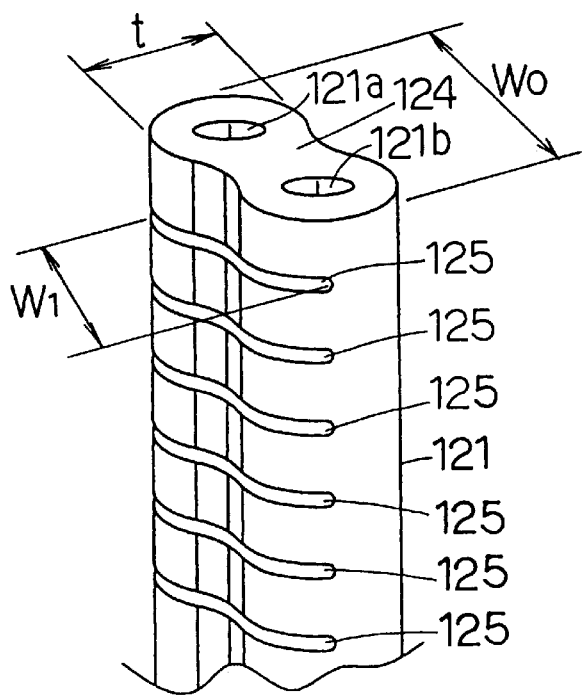
FIG. 2 is a perspective diagram showing a part of a tank portion of a header tank of the radiator.

Both side plates 113 for reinforcing the core portion 113 are provided at both end sides of the core portion 110 to be parallel to the flat tubes 111. Both ends of each flat tube 111 and both ends of each side plate 113 in a longitudinal direction of the flat tubes 111 are blazed to both right and left header tanks 120, as shown in FIG. 1. Each of the header tanks 120 has a tank portion 121 in which first and second tank passages 121a, 121b communicating with each of the flat tubes 111 are formed, as shown in FIG. 2. Each of the first and second tank passages 121a, 121b is formed into an approximate cylindrical shape. The tank portion 121 is connected to each end of the flat tubes 111 at one end side to extend in an extending direction perpendicular to the longitudinal direction of the flat tubes 111.

Both caps 122 are brazed to both ends of the tank portion 121 in the extending direction to close the tank passages 121a, 121b of the tank portion 121. Each of the header tank 120 includes the cap 122 and the tank portion 121, and $CO_2$ refrigerant is distributed or joined through the header tanks 120. In FIG. 1, the right header tank 120 is for distributing $CO_2$ refrigerant into each flat tube 111, and the left header tank 120 is for joining $CO_2$ refrigerant from each flat tube 111. A connection block 123a formed in the right header tank 120 is connected to a compressor (not shown) of the $CO_2$ refrigerant cycle, and a connection block 123b formed in the left header tank 120 is connected to a condenser (not shown) of the $CO_2$ refrigerant cycle.

As shown in FIG. 2, the two tank passages 121a, 121b are formed in the tank portion 121 of the header tank 120 to extend to the extending direction of the header tank 120. Both of the tank passages 121a, 121b are partitioned from each other by a supporting portion 124 extending in a direction parallel to the longitudinal direction of the flat tubes 111 between the tank passages 121a, 121b. The supporting portion 124 is an inner wall of the tank portion 121 of the header tank 120.

Figure 3A:
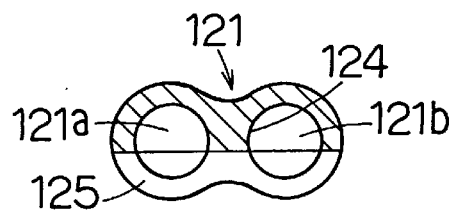
FIG. 3A, FIG. 3B and FIG. 3C are cross-sectional views of the tank portion, respectively, showing a shaving step for forming an insertion hole of the tank portion according to the first embodiment.
Figure 3B:
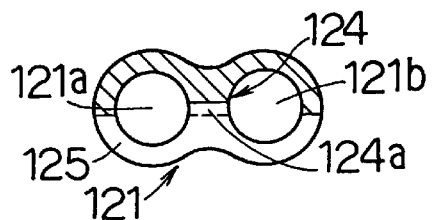
Figure 3C:
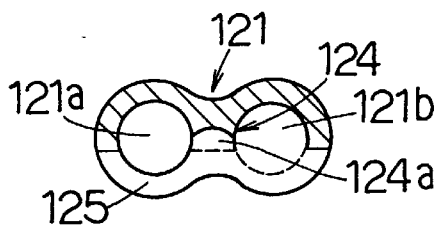
Figure 4:
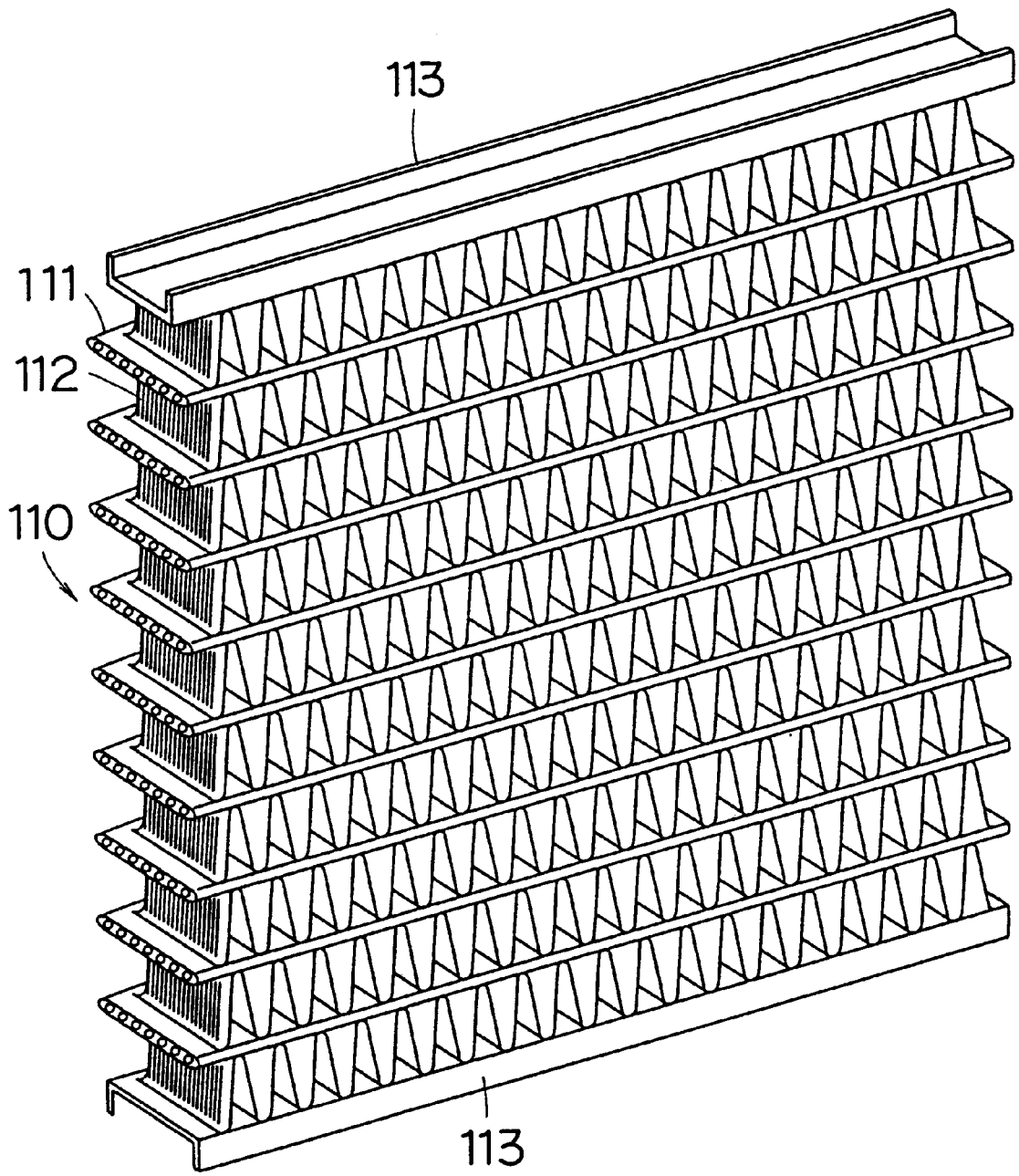
FIG. 4 is a perspective diagram showing a provisionally assembled core portion of the radiator.

Further, a plurality of flat insertion holes 125 into which the flat tubes 111 are inserted are formed in the tank portion 121 so that the flat tubes 111 are connected to the tank portion 121 of the header tank 120. The tank portion 121 of the header tank 120 has a tank width Wo in a tank width direction perpendicular to both of the extending direction of the header tank 120 and the longitudinal direction of the flat tubes 111, and each of the insertion holes 125 has a hole width W1 in the tank width direction. The insertion holes 125 are formed through a shaving step. That is, the tank portion 121 of the header tank 120 is shaven by a milling cutter from one end of the tank portion 121 to the other end thereof in the tank width direction so that the insertion holes 125 are formed. As shown in FIG. 3A, to form each insertion hole 125, a part of an outer wall of the tank portion 121 in the tank width direction and a part of the supporting portion 124 are shaven in the milling step. Therefore, the hole width W1 of the insertion hole 125 can be set to be approximately equal to the tank width Wo. Thereafter, as shown in FIGS. 3B, 3C, a part of the supporting portion 124 is further shaven during the forming step of the insertion holes 125, so that a communication path 124a through which both of the tank passages 121a, 121b communicate with each other is formed.

In the radiator 100 of the first embodiment, as shown in FIG. 1, each of the tank passages 121a, 121b of the tank portion 121 is partitioned into a plurality of spaces (e.g., two spaces in the first embodiment) in the extending direction of the header tank 120 by a separator 126, so that $CO_2$ refrigerant meanderingly flows through the flat tubes 111 of the core portion 110 in the right-left direction of FIG. 1.

Next, the method for manufacturing the radiator 100 will be now described. First, in a tube forming step, each of the flat tubes 111 is integrally formed by extruding or drawing an uncoated aluminum material, and is cut to have a predetermined length. Further, an aluminum thin plate (A3003) which is coated by a brazing material on both surfaces is formed into a wave shape using a roller-forming method, and the wave-shaped plate is cut to have a predetermined length, so that the corrugated fin 112 is formed in a fin forming step. Further, an aluminum thin plate which is coated by a brazing material on both surfaces is formed into a U-shape in cross-section by pressing the thin plate, and the U-shaped plate is cut to have a predetermined length, so that the side plate 113 is formed in a side plate forming step.

On the other hand, the header tank 120 is formed during a tank manufacturing step. First, the tank portion 121 having the tank passages 121a, 121b and the supporting portion 124 shown in FIG. 2 is formed by extruding or drawing of an aluminum alloy material in a tank forming step. Next, as shown in FIG. 3A, the insertion holes 125 are formed by milling the tank portion 121 from one end of the tank portion 121 toward the other end of the tank portion 121 in the tank width direction, in a first shaving step. Thereafter, as shown in FIGS. 3B, 3C, a part of the supporting portion is further shaven so that the communication path 124a is formed in a second shaving step. In the first embodiment, the tank manufacturing step includes the tank forming step and the first and second shaving steps.

Next, the flat tubes 111 formed from the tube forming step and the corrugated fins 112 formed from the fin forming step are provisionally overlapped alternately, and the side plates 113 formed from the side plate forming step are provisionally attached to positions corresponding to both sides of the core portion 110. Thereafter, the flat tubes 111, the corrugated fins 112 and the side plates 113 are provisionally fixed using a fastening jig (not shown) such as a fastening wire, in a first assembling step.

In a second assembling step, the cap 122, the separator 126 and the connection blocks 123a, 123b are provisionally assembled to the tank portion 121 by a fastening jig (not shown). Thereafter, in a third assembling step, a brazing material is placed on both ends of each of the flat tubes 111 and the side plates 113, and the flat tubes 111 are inserted into the insertion holes 125 of the tank portion 121. Therefore, in the third assembling step, the core portion 111 provisionally assembled in the first assembling step and the header tank 120 provisionally assembled in the second assembling step are provisionally assembled.

Next, in a brazing step, the radiator 100 provisionally assembled in the third assembling step is brazed integrally within a furnace, so that each components of the radiator 100 are integrated from each other.

In the above-described manufacturing step of the radiator 100, the order of the tube forming step, the fin forming step, the side plate forming step, and the tank manufacturing step may be arbitrarily changed.

According to the first embodiment of the present invention, because the insertion holes 125 are formed in the shaving step by shaving a part of the tank portion 121 integrally formed in the extruding step or the drawing step, the insertion holes 125 are readily formed in the tank portion 121 of the header tank 120. Therefore, the pressure tightness and the manufacturing workability of the radiator 100 can be improved. Further, the hole width W1 of each insertion hole 125 is approximately equal to the tank width Wo of the tank portion 121 in the tank width direction, the tank width Wo of the header tank 120 becomes smaller relative to the flat tubes 111. Further, because the supporting portion 124 connects inner walls forming the tank passages 121a, 121b of the tank portion 121, the pressure tightness of the header tank 120 can be further improved. Thus, even when the radiator 100 is used in the $CO_2$ refrigerant cycle, it can prevent the $CO_2$ refrigerant from being leaked from the connection portion between the flat tubes 111 and the header tank 120.

Each of the tank passages 121a, 121b are approximately formed into the cylindrical shape, and both of the tank passages 121a, 121b are arranged in the tank width direction. It is compared with a comparison example where only a single tank passage is formed in the tank portion 121, the thickness "t" of the tank portion 121 of the header tank 120 can be reduced as shown in FIG. 2, without reducing the space of the tank passages 121a, 121b of the header tank 120. Here, the thickness "t" of the tank portion 121 is a dimension of the tank portion 121 in a direction perpendicular to the extending direction of the header tank 120 and the tank width direction.

Figure 5:
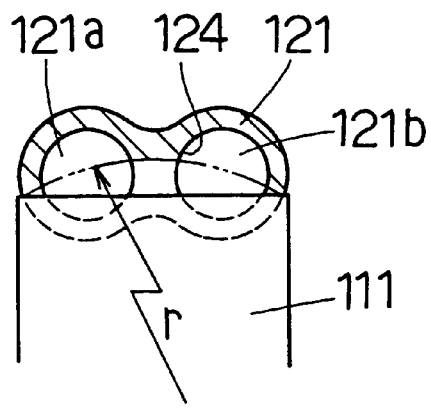
FIG. 5 is a cross-sectional view of a tank portion of a header tank according to a second preferred embodiment of the present invention.

A second preferred embodiment of the present invention will be now described with reference to FIG. 5. In the above-described first embodiment, the insertion hole 125 and the communication path 124a are formed through the first and second shaving steps. In the second embodiment, as shown in FIG. 5, the tank portion 121 is shaven from a direction of the thickness t of the tank portion 121 by using a milling machine having a blade radius "r" greatly larger than the tank width Wo, so that the insertion hole 125 and the communication path 124a is formed in one shaving step. Therefore, the manufacturing step of the radiator 100 can be made simple, and the radiator 100 can be manufactured in low cost.

Although the present invention has been fully described in connection with preferred embodiments thereof with reference to the accompanying drawings, it is to be noted that various changes and modifications will become apparent to those skilled in the art.

Figure 6:
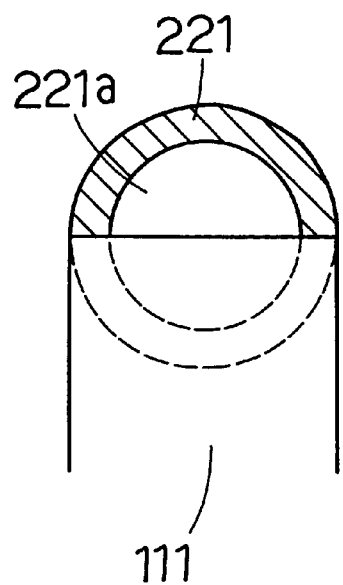
FIG. 6 is a cross-sectional view of a tank portion of a header tank according to a modification of the present invention.
Figure 7A:
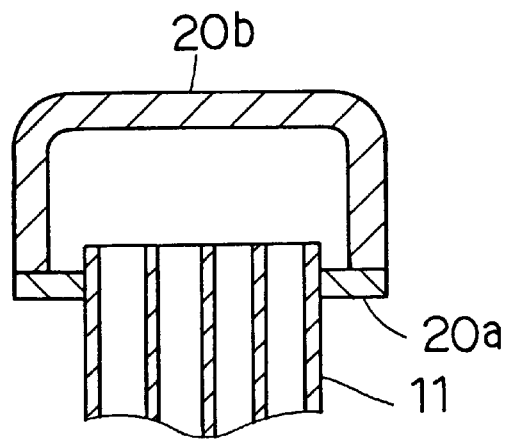
FIG. 7A is a cross-sectional view showing a connection structure between a header tank and a tube of a conventional radiator.
Figure 7B:
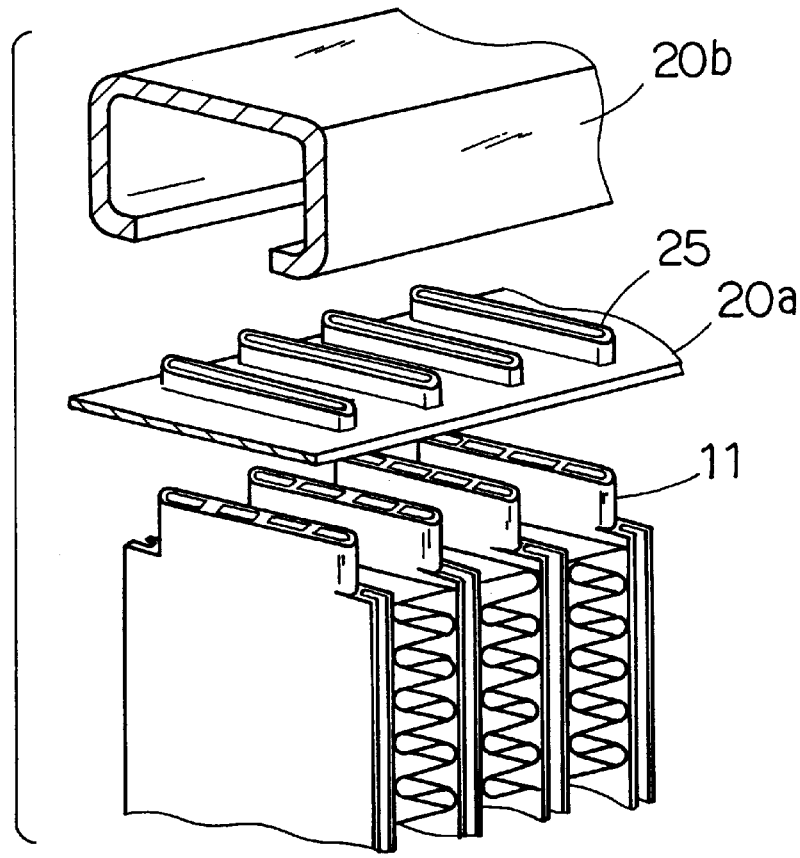
FIG. 7B is a disassemble perspective view showing the header tank and the tube of the conventional radiator.

For example, in each of the first and second embodiments, both of the tank passages 121a, 121b are formed in the tank portion 121 of the header tank 120. However, as shown in FIG. 6, a single tank passage 221a may be formed in a tank portion 221. Further, number of tank passages may be set to be more than two.

In each of the first and second embodiments, each of the corrugated fins 112 is formed from an aluminum plate coated by a brazing material, and is brazed to the flat tubes 111. However, the flat tubes 111 and the corrugated fins 112 may be integrally formed firstly, and are brazed together after a brazing material is thermal sprayed to the flat tubes 111. Further, in the above-described embodiments, the shaving step of the present invention is performed by the shaving such as the milling; however, may be performed by sawing, for example.

Such changes and modifications are to be understood as being within the scope of the present invention as defined by the appended claims.

What is claimed is:

1. A heat exchanger comprising:

a plurality of tubes in which a fluid flows, each of said tubes having both ends in a longitudinal direction; and a header tank having a tank portion extending in an extending direction perpendicular to said longitudinal direction, said tank portion being connected to said ends of said tubes at predetermined positions, wherein:

said tank portion defines a plurality of tank passages extending in said extending direction, said tank passages being arranged in a width direction perpendicular to both of said longitudinal direction of said tubes and said extending direction of said tank portion;

said tank portion has insertion holes into which said tubes are inserted, at said predetermined positions; and each of said insertion holes has a hole width in said width direction, said hole width being approximately equal to a tank width of said tank portion in said width direction.

2. The heat exchanger according to claim 1, wherein:

said tank portion of said header tank is integrally formed by extrusion of an aluminum material; and said insertion holes are formed by shaving said tank portion from said extrusion.

3. The heat exchanger according to claim 1, wherein:

said tank portion of said header tank is integrally formed by drawing of an aluminum material; and said insertion holes are formed by shaving said tank portion from said drawing.

4. The heat exchanger according to claim 1, wherein:

said tank portion has an inner wall surface defining said tank passages; and said inner wall surface is a smooth surface along an entire periphery in a cross-section perpendicular to said extending direction.

5. The heat exchanger according to claim 4, wherein:

said tank portion has a supporting portion extending in a direction parallel to said longitudinal direction of said tubes to partition said tank passage from each other; and said supporting portion has a communication pass through which said tank passages communicate with each other.

6. The heat exchanger according to claim 5, wherein said communication path is formed by shaving said supporting portion.

7. The heat exchanger according to claim 4, wherein:

said tank portion has an outer wall surface defining an outer shape; and said outer wall surface is a smooth surface along an entire peripheral in the cross-section perpendicular to said extending direction.

8. The heat exchanger according to claim 1, wherein said tubes are inserted into said insertion holes of said tank portion to be connected to said tank portion of said header tank.

9. The heat exchanger according to claim 1, wherein the fluid is carbon dioxide.

10. A heat exchanger comprising:

a plurality of tubes in which a fluid flows, each of said tubes having both ends in a longitudinal direction; and a header tank having a tank portion extending in an extending direction perpendicular to said longitudinal direction, said tank portion being connected to said ends of said tubes at predetermined portions, wherein:

said tank portion has an approximately uniform wall thickness, an inner wall surface defining a single tank passage extending in said extending direction, and an outer wall surface defining a constant outer shape along said extending direction;

each of said inner wall surface and said outer wall surface is a smooth surface along an entire periphery in a cross-section perpendicular to said extending direction;

said tank portion further has insertion holes into which said tubes are inserted, at said predetermined positions; and each of said insertion holes has a hole width in a width direction perpendicular to both of said longitudinal direction of said tubes and said extending direction of said tank portion, said hole width being approximately equal to a tank width of said tank portion in said width direction.

11. The heat exchanger according to claim 10, wherein the fluid is carbon dioxide.

* * * * *